United States Patent
Li et al.

(10) Patent No.: US 9,376,078 B1
(45) Date of Patent: Jun. 28, 2016

(54) SEAT MECHANISM INERTIA LOCKING SYSTEM

(71) Applicant: Ford Global Technologies, LLC, Dearborn, MI (US)

(72) Inventors: Richard Li, Novi, MI (US); Joseph Michael Kish, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/600,374

(22) Filed: Jan. 20, 2015

(51) Int. Cl.
| | |
|---|---|
| *B60N 2/02* | (2006.01) |
| *B60N 2/48* | (2006.01) |
| *B60R 21/02* | (2006.01) |
| *B60N 2/20* | (2006.01) |
| *B60N 2/22* | (2006.01) |
| *B60N 2/235* | (2006.01) |
| *B60N 2/68* | (2006.01) |
| *B60N 2/427* | (2006.01) |

(52) U.S. Cl.
CPC . *B60R 21/02* (2013.01); *B60N 2/20* (2013.01); *B60N 2/2227* (2013.01); *B60N 2/22* (2013.01); *B60N 2/2356* (2013.01); *B60N 2/42745* (2013.01); *B60N 2/682* (2013.01); *B60R 2021/0273* (2013.01)

(58) Field of Classification Search
CPC .......... B60N 2/20; B60N 2/22; B60N 2/2356; B60N 2/682; B60N 2/42745
USPC ............... 297/378.11, 354.1, 378.13, 378.14, 297/376, 369, 365, 366, 353
See application file for complete search history.

(56) References Cited

U.S. PATENT DOCUMENTS

| | | | |
|---|---|---|---|
| 4,118,067 A | 10/1978 | Tanaka | |
| 4,225,177 A | 9/1980 | Kluting | |
| 5,163,736 A | 11/1992 | Aljundi | |
| 6,568,758 B1 * | 5/2003 | Berg | B60N 2/23 297/362.12 |
| 6,655,724 B1 | 12/2003 | Yoshino et al. | |
| 7,748,778 B1 * | 7/2010 | Udriste | B60N 2/06 297/216.1 |
| 2004/0262973 A1 * | 12/2004 | Reubeuze | B60N 2/01541 297/378.13 |
| 2007/0194615 A1 * | 8/2007 | Fischer | B60N 2/02 297/354.12 |
| 2012/0146370 A1 * | 6/2012 | Lee | B60N 2/4228 297/216.14 |
| 2013/0313395 A1 * | 11/2013 | Blake | B60N 2/01583 248/503.1 |

* cited by examiner

*Primary Examiner* — Chi Q Nguyen
(74) *Attorney, Agent, or Firm* — Vichit Chea; Price Heneveld LLP

(57) ABSTRACT

An inertia locking system for a seat of a vehicle includes a base member that is fixed to a seat structure and a Double D shaped shaft that rotates with a cam to allow the seat back to be adjusted. A movable inertia locking bracket has an opening including a circular portion and a slot portion. The Double D shaped shaft is disposed in the opening of the inertia locking bracket and includes flat opposite surfaces that prevent rotation of the Double D shaped shaft relative to the inertia bracket when the Double D shaped shaft is disposed in the slot portion of the opening. Acceleration causes the inertia locking bracket to slide forward such that the Double D shaped shaft is disposed in the elongate slot portion to prevent rotation of the Double D shaped shaft and prevent release of the seat back mechanism.

20 Claims, 6 Drawing Sheets

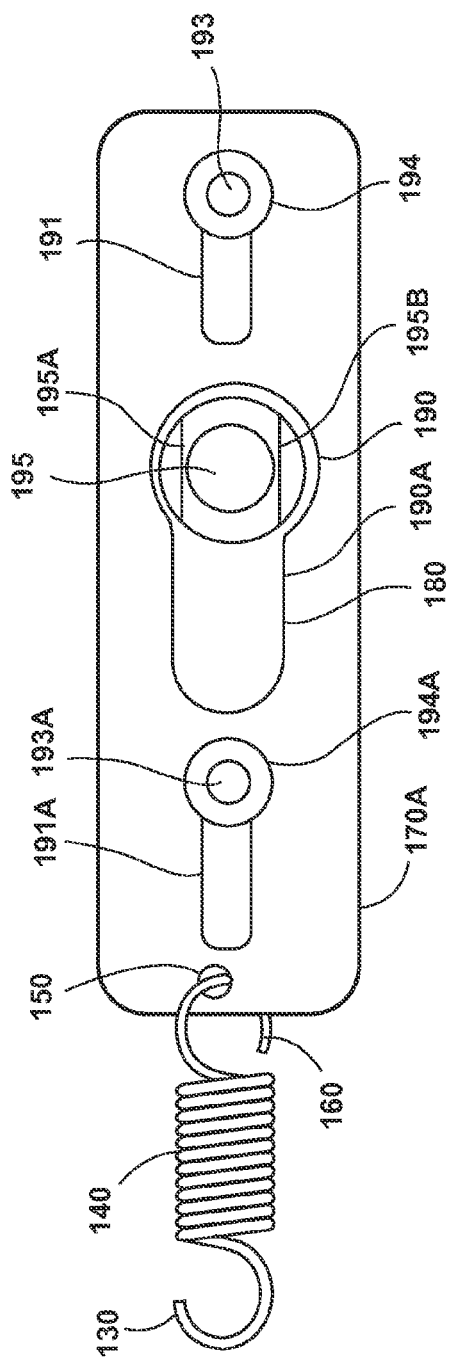
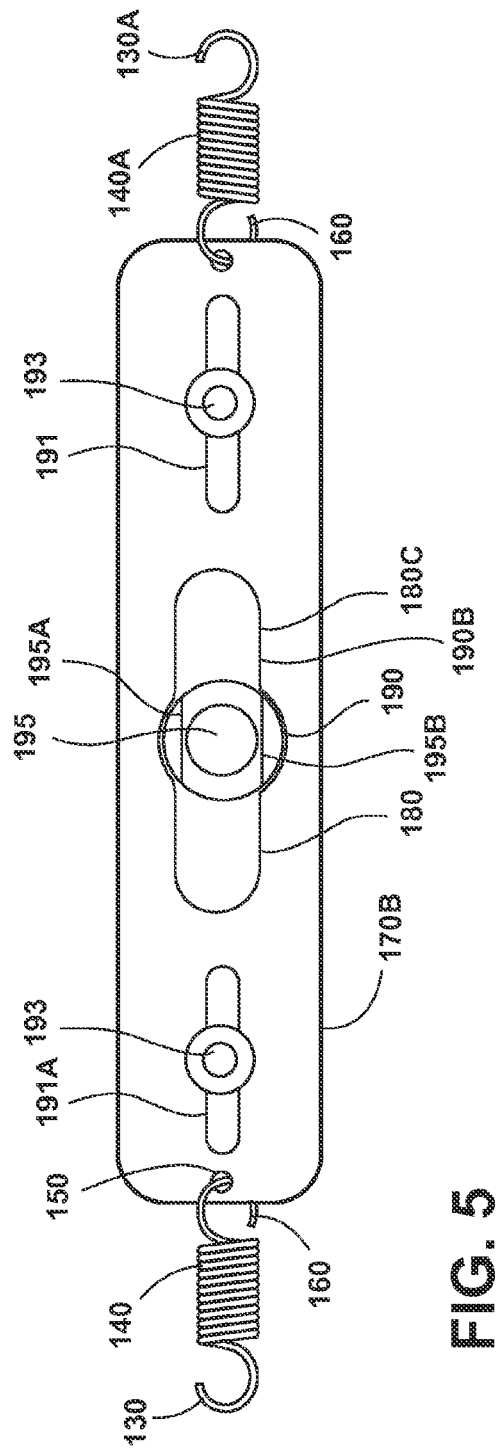
FIG. 4
FIG. 5

SEAT MECHANISM INERTIA LOCKING SYSTEM

FIELD OF THE DISCLOSURE

The present disclosure generally relates to an inertia locking assembly for a seat back mechanism. More particularly, exemplary embodiments of the disclosure relate to an inertia locking system for preventing a seatback from being released from its working position as a result of a collision.

BACKGROUND OF THE DISCLOSURE

Vehicle seating assemblies typically include a seatback to support the back of a passenger in an upright sitting position and various reclined positions. Similar to other portions of a vehicle seating assembly, seatbacks are commonly designed to support a passenger in the upright sitting position upon acceleration, change in direction, and collision of the vehicle. However, known mechanisms may suffer from various drawbacks.

SUMMARY OF THE DISCLOSURE

According to one aspect of the disclosed exemplary embodiments, an inertia locking system for a seatback of a seat back mechanism is provided. The inertia locking system includes a base member configured to be connected to a seat back mechanism and a double D-shaped shaft configured to be mounted to the seat back mechanism. An inertia locking bracket having a circular opening is mounted to the seat back mechanism, wherein the double D-shaped shaft protrudes through the circular opening of the inertia locking bracket. A first elongate slot extends from a side of the circular opening and a second elongate slot is provided in the inertia locking bracket. The second elongate slot being adjacent to the circular opening and first elongate slot and a pin is connected to the base member and protrudes from the second elongate slot. A spring is connected to the inertia locking bracket at a location near an edge of the inertia locking bracket, wherein the first elongate slot is between the spring and the second elongate slot; and wherein as a result of a frontal vehicular collision, the inertia locking bracket slides in a vehicle forward direction and the double D-shaped shaft becomes locked in the first elongate slot to prevent the seat mechanism from releasing the seatback as a result of a vehicle collision.

Another exemplary embodiment provides a seat back mechanism having an inertia locking system for preventing a vehicle seatback from being released from a working position during a collision. The inertia locking system of the seat back mechanism includes a base member configured to be connected to the seat back mechanism and a double D-shaped shaft configured to be mounted to the seat back mechanism. An inertia locking bracket is provided having a circular opening, wherein the double D-shaped shaft protrudes through the circular opening of the inertia locking bracket. A first elongate slot extends from a side of the circular opening and a second elongate slot is also provided in the inertia locking bracket, the second elongate slot being adjacent to the circular opening. A pin is connected to the base member and protrudes from the second elongate slot; and a spring is connected to the inertia locking bracket at an edge of the inertia locking bracket wherein the first elongate slot is between the spring and the second elongate slot, wherein as a result of a frontal collision, the inertia locking bracket slides in a vehicle forward direction and the double D-shaped shaft becomes locked in the first elongate slot to prevent the seat back mechanism from releasing the vehicle seatback from its working position.

According to yet another aspect of the exemplary embodiments, an inertia locking system is provided. The inertia locking system includes a base member and a double D-shaped shaft configured to be mounted to the base member. An inertia locking bracket is provided having a circular opening, wherein the double D-shaped shaft protrudes through the circular opening of the inertia locking bracket. A first elongate slot extends from a side of the circular opening and a second elongate slot is provided in the inertia locking bracket so that the second elongate slot is adjacent to the first elongate slot and the circular opening. A pin is connected to the base member and protrudes from the second elongate slot and a spring is connected to the inertia locking bracket near an edge of the inertia locking bracket so that the first elongate slot is between the spring and the second elongate bracket, wherein in a frontal collision, the inertia locking bracket slides in a vehicle forward direction and the double D-shaped shaft becomes locked in the first elongate slot.

BRIEF DESCRIPTION OF THE DRAWINGS

In the drawings:

FIG. 4 is an inertia locking system for a vehicle seat assembly, according to another exemplary embodiment;

FIG. 5 is an inertia locking system for a vehicle seat assembly, according to yet another exemplary embodiment;

DETAILED DESCRIPTION OF THE EXEMPLARY EMBODIMENTS

Figure 1:
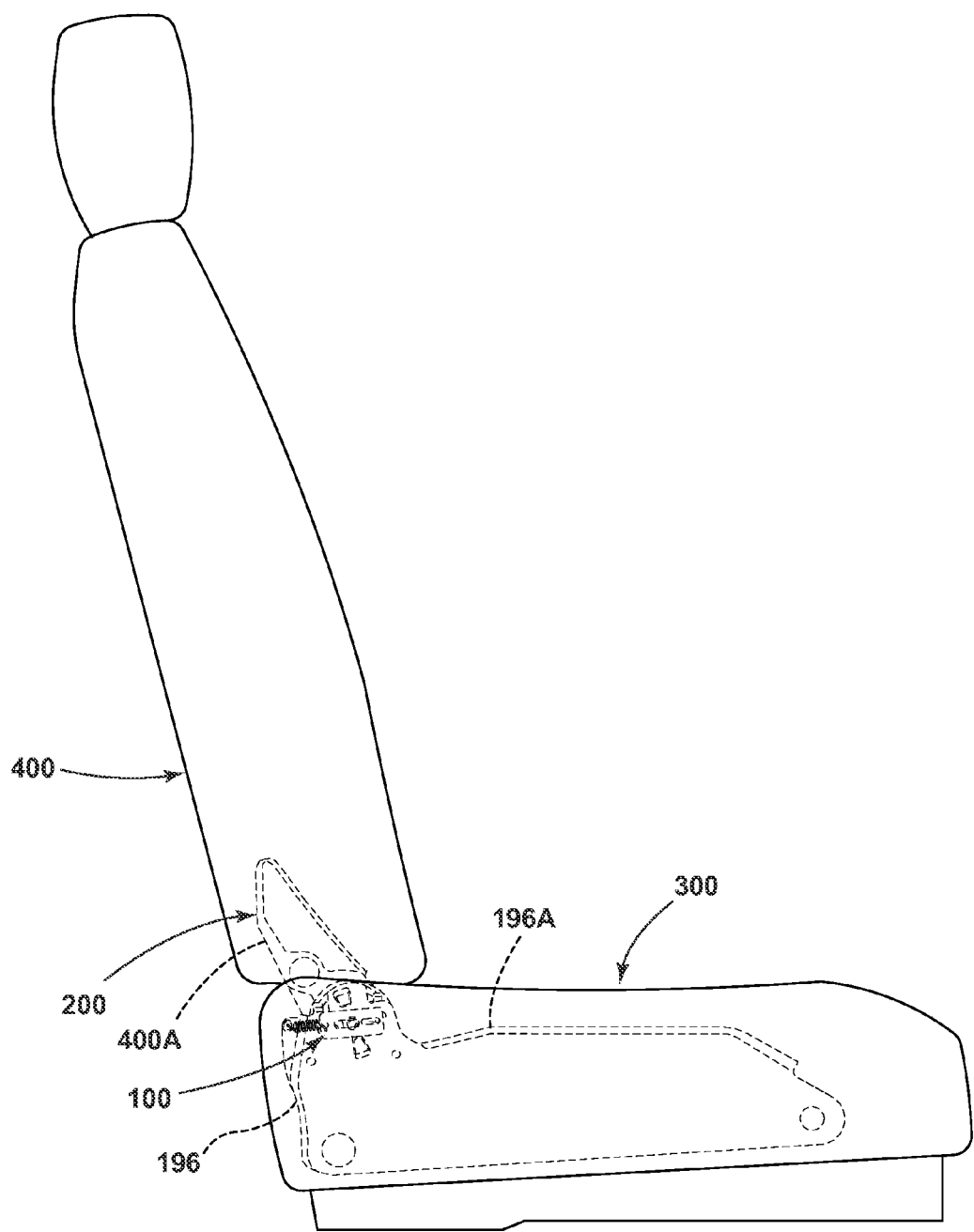
FIG. 1 is a side view of a vehicle seat assembly having an inertia locking system according to an exemplary embodiment.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element. In addition, the terms "crash" and "collision" are sometimes used interchangeably.

FIG. 1 is a side view of a vehicle seat having a seat back mechanism and an inertia locking system, according to an exemplary embodiment. FIG. 1 illustrates an inertia locking system 100, a seat back mechanism 200, a vehicle seat 300 and a seat back 400. The seat back mechanism 200 allows the angular position of vehicle seat back 400 relative to seat 300 to be adjusted by a vehicle occupant. The seat back mechanism 200 can be released by a user by rotating a shaft 195 (FIG. 2) to permit the angular position of seat back 400 to be adjusted. When seat back mechanism 200 is locked-latched, it maintains the vehicle seat back 400 in a selected angular position. As discussed in more detail below, the inertia locking system or mechanism 100 is configured to maintain the seatback 400 in a selected position during a frontal or rear collision.

Figure 2:
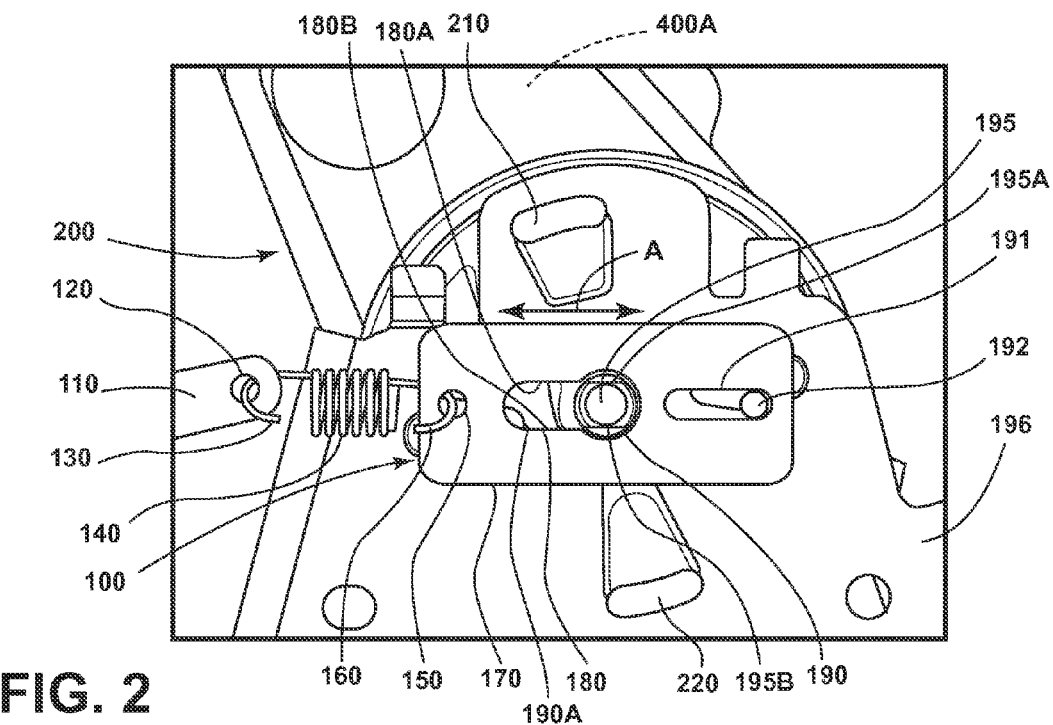
FIG. 2 is an inertia locking system for a vehicle seat assembly of an exemplary embodiment when the system is in normal usage.

FIG. 2 represents operation of the inertia locking system 100 when it is not experiencing significant fore-aft acceleration. A base member 196 is rigidly secured to seat structure 196A (FIG. 1). When the seat back mechanism is released for adjustment of the angular position of seat back 400, seat back structure 400A rotates relative to base member 196 about a generally horizontal axis defined by a shaft 195 that is located on seat structure 196A. Seat back mechanism 200 includes a cam (not shown) that is connected to shaft 195, and a release lever (not shown) is connected to shaft 195. Rotation of the release lever causes the cam to rotate and release a pair of pawl members (not shown) of seat back mechanism 200 to permit angular adjustment of the position of the seatback 400. Thus, rotation of shaft 195 releases seat back mechanism 200. It will be understood that seat back mechanism 200 may comprise various types of known seat back mechanisms having a rotating release shaft 195.

Inertia locking system 100 includes an inertia locking bracket 170 that is movably connected to base member 196 for fore-aft movement as shown by the arrow "A." Inertia locking system 100 also includes a spring bracket 110 that is fixed to base member 196 or seat structure 196A. Spring bracket 110 includes an aperture 120 that receives one end 130 of a spring 140. Another end 160 of the spring 140, which is located at an opposite end of the spring 140 than the spring end 130, is mounted within an aperture 150 of inertia locking bracket 170 to thereby bias the inertia locking bracket in a rearward direction. In this exemplary embodiment, the inertia locking bracket 170 is generally illustrated as a rectangle, but this is by way of example only, and can be configured in many other shapes, as would be understood by one of ordinary skill in the art. As illustrated, a keyhole-shaped opening 190A through inertia locking bracket 170 includes a circular opening portion 190 and a first elongated slot portion 180 having spaced apart linear edges 180A and 180B. Circular opening 190 may be located in a central area of the inertia locking bracket 170. Shaft 195 has a non-circular cross sectional shape and includes flat surfaces 195A and 195B on opposite sides thereof such that shaft 195 is "double D" shaped in cross section. As discussed in more detail below, shaft 195 rotates freely relative to inertia locking bracket 170 when shaft 195 is disposed in circular opening 190 to permit release of seat back mechanism 200, but the linear edges 180A and 180B of slot portion 180 engage flat surfaces 195A and 195B of shaft 195 and prevent rotation of shaft 195 when shaft 195 is disposed in slot portion 180 of opening 190A to prevent release of seat back mechanism 200.

As shown in FIG. 2, when the inertia locking bracket 170 is not subject to significant acceleration, spring 140 biases bracket 170 to the rest position shown in FIG. 2. During normal operation, the double D-shaped shaft 195 can rotate in the circular opening 190 of the inertia locking bracket 170 during adjustment of the seatback 400 through the seat back mechanism 200. Adjacent to the circular opening 190 and the first elongate slot 180 is a second elongate slot 191. A pin 192 projects outwardly from base 196 into the second elongate slot 191. The pin 192 is secured to the base member 196. In addition, a first connector 210 and a second connector 220 secure the base member 196 to the seat back mechanism 200.

Figure 3:
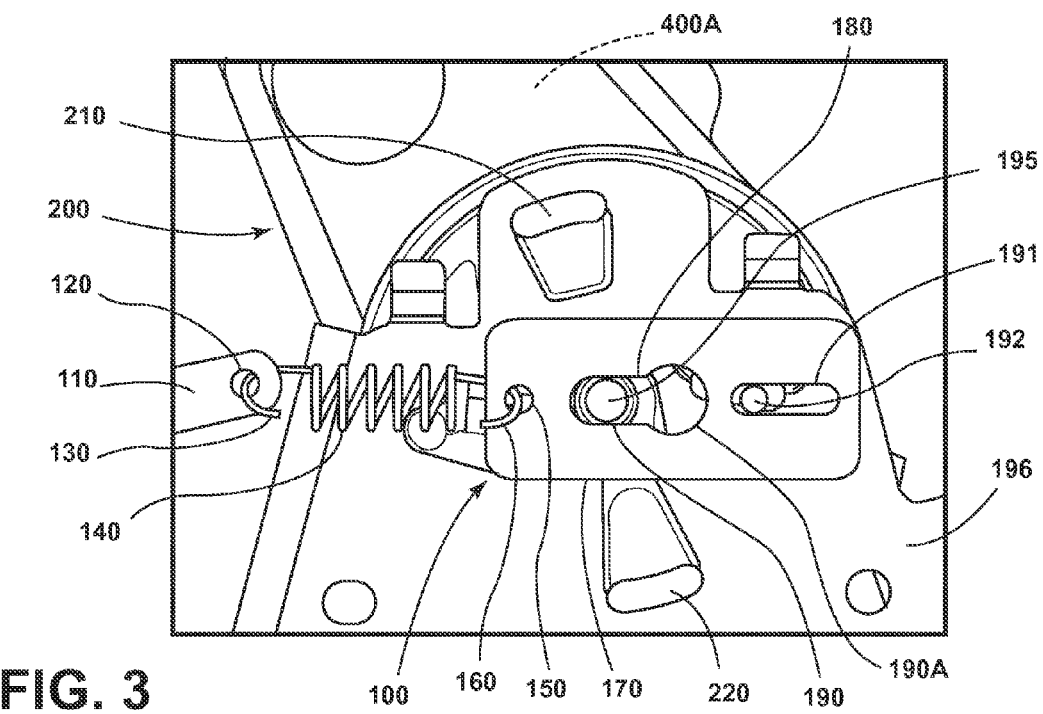
FIG. 3 is an inertia locking system for a vehicle seat assembly according to the exemplary embodiment of FIG. 2 when the system is experiencing acceleration.

FIG. 3 represents a locked position of the inertia locking bracket 170 of FIG. 2. When the inertia locking bracket 170 is subject to significant acceleration inertia locking bracket 170 is disposed in the locked position of FIG. 3. In this exemplary embodiment, in response to a frontal impact, the inertia locking bracket 170 moves in a vehicle forward direction from the rest position of FIG. 2 to the locked position of FIG. 3. As shown in FIG. 3, the double D-shaped shaft 195 slides into the first elongate slot 180 due to forward motion of inertia locking bracket 170. The spring 140 is stretched as the inertia locking bracket 170 moves in a vehicle forward direction such that spring 140 biases inertia locking bracket 170 from its locked position towards its rest position. As discussed in more detail below, the stiffness of spring 140, the preload tension of spring 140, and the mass of inertia locking bracket 170 can be selected to provide the dynamic response/behavior as required for a particular application.

As the inertia locking bracket 170 moves in a vehicle forward direction, the second elongate slot 191 moves forward as well and the pin 192 is shifted to a location near or at the left side of the second elongate slot 191. Because the double D-shaped shaft 195 is now in the first elongate slot 180, the double D-shaped shaft 195 rotationally locked and cannot rotate relative to inertia locking bracket 170. Pin 192 prevents rotation of inertia locking bracket 170 relative to base member 196 such that double D-shaped shaft 195 cannot rotate when inertia locking bracket 170 is in the position of FIG. 3. If an inertia force is applied in a manner that tends to rotate double D-shaped shaft 195, double D-shaped shaft 195 will be prevented from rotating, thereby preventing movement of seat back 400. As shown in FIG. 3, to be described in further detail below in FIG. 6, the inertia locking mechanism 100 may be configured such that the first elongate slot 180 of the inertia locking bracket 170 locks the double D-shaped shaft 195 from rotation in about 27 ms from the time of impact (i. e. the time at which inertia locking bracket 170 is first subjected to inertia forces) when subject to a 13 g acceleration due to movement of the inertia locking member 170 in a vehicle forward direction of about 10 mm.

FIG. 4 illustrates another exemplary embodiment including an inertia locking bracket 170A having a third elongate slot 191A. Slot 191A has substantially the same size and shape as the second elongate slot 191, but slot 191A is located on an opposite side of the inertia locking bracket 170A from the second elongate slot 191. The third elongate slot 191A is located between the aperture 150 holding the spring 140 and the first elongate slot 180. Pins 193A have a different structure than the pin 192 of FIGS. 2 and 3 in that the pins 193 and 193A have larger head portions 194 and 194A, respectively than the head of pin 192. In the exemplary embodiment of FIG. 4, the additional elongate slot 191A and pin 193A provide enhanced stability of the inertia locking bracket 170.

FIG. 5 represents another exemplary embodiment. In this exemplary embodiment, an inertia locking bracket 170B is configured to prevent movement of seatback 400 from its working position when inertia locking bracket 170B is subjected to both fore and aft accelerations. Fore and aft accelerations may result from front and rear vehicle impacts. In FIG. 5, an opening 190B includes a circular center portion 190, first slot portion 180, and a second slot portion 180C which extends from the circular opening 190 in a direction opposite from the first elongate slot 180. In this exemplary embodiment, the bracket 170B can move in either a vehicle forward direction or in a vehicle rearward direction, depending upon the vehicle collision being a frontal or a rear collision. Movement of bracket 170B in first (e.g. forward) direction causes double D shaft 195 to be disposed in first slot portion 180, and movement of bracket 170B in a second direction (e.g. rearward) causes double D shaft 195 to be disposed in second slot portion 180C. A spring 140A is connected to inertia locking bracket 170B adjacent to slot 191. Spring 140A may be substantially the same as the spring 140 of FIGS. 2-4, and end 130A of spring 140A may be connected to a fixed bracket (not shown) that is similar to bracket 110 (FIG. 2) to thereby connect spring 140A to base member 196 or seat structure 196A. Springs 140 and 140A are configured to generate forces acting on bracket 170B in opposite directions. Springs 140 and 140A may be preloaded (stretched) such that bracket 170B is biased towards the position of FIG. 5 wherein double D shaft 195 is disposed in circular center portion 190 of opening 190B. Thus, in this exemplary embodiment, the bracket 170B can move in either a vehicle forward direction in response to a frontal crash such that double D shaft 195 is locked to prevent rotation by the first elongate slot portion 180. The bracket 170B can also move in a vehicle rearward direction in response to a rear collision such that the double D shaft 195 is locked by the second slot portion 180C.

Figure 6:
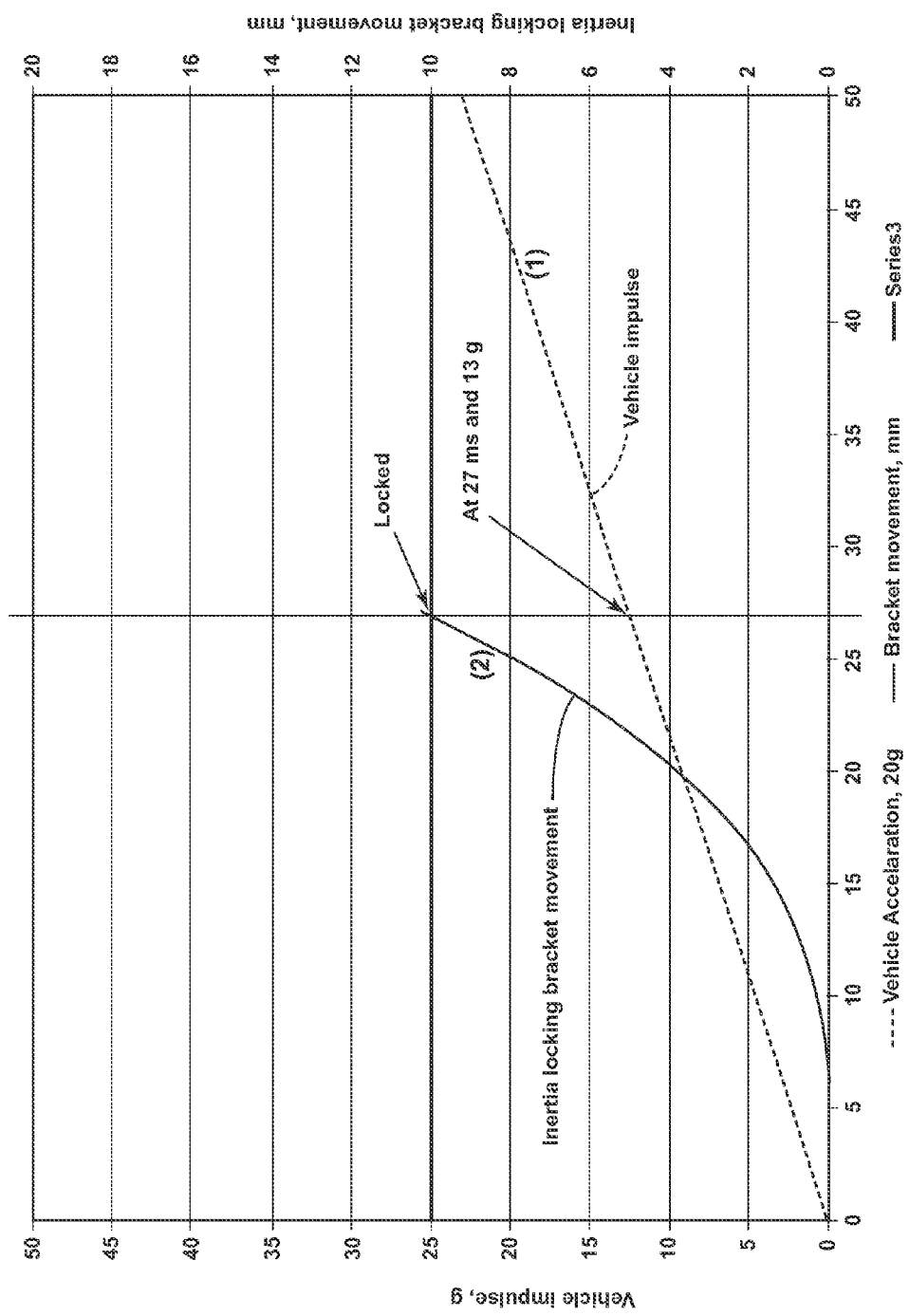
FIG. 6 is a graph of the time it takes for an inertia locking bracket to lock, based on vehicle impulse and movement of a inertia locking bracket.

FIG. 6 represents a graph relating to the time it takes to lock the inertia locking bracket 170. As shown in the graph of FIG. 6, the left vertical axis of the graph represents vehicle impulse in g. The right vertical axis of the graph represents movement of the inertia locking bracket 170, in mm. The horizontal axis at the bottom of the graph represents time in ms. Two curved lines of the graph, respectively labeled (1) and (2), are shown. The vertical line in the center of the graph represents the time of locking of the inertia locking bracket 170. As shown by line (1), when the vehicle is decelerating during a collision, the vehicle impulse at 27 ms is 13 g. At this time, as shown in graph line (2), which represents movement of the inertia locking bracket 170 at 27 ms, the inertia locking bracket 170 is locked. This occurs at a 10 mm movement of the inertia locking bracket 170. Thus, the 10 mm movement of the inertia locking bracket 170 at 27 ms and 13 g is sufficient to move the inertia locking bracket 170 from the position in FIG. 2 to the position of FIG. 3, which is sufficient to lock the inertia locking bracket 170 in order to prevent movement of the vehicle seatback from its working position. FIG. 6 represents a response of one possible configuration of an inertia locking mechanism according to the present invention. The inertia locking mechanism of the present invention may be configured to respond as required for a particular application. For example, the mass of brackets 170, 170A, and/or 170B and/or the stiffness's of springs 140 and/or 140A may be increased or decreased to change the response of the inertia locking mechanism. The inertia locking system 100 is typically configured such that bracket shifts in ranges of about 5-100 mm, 5-45 ms, and the g forces are typically about 5-20 g.

Figure 7:
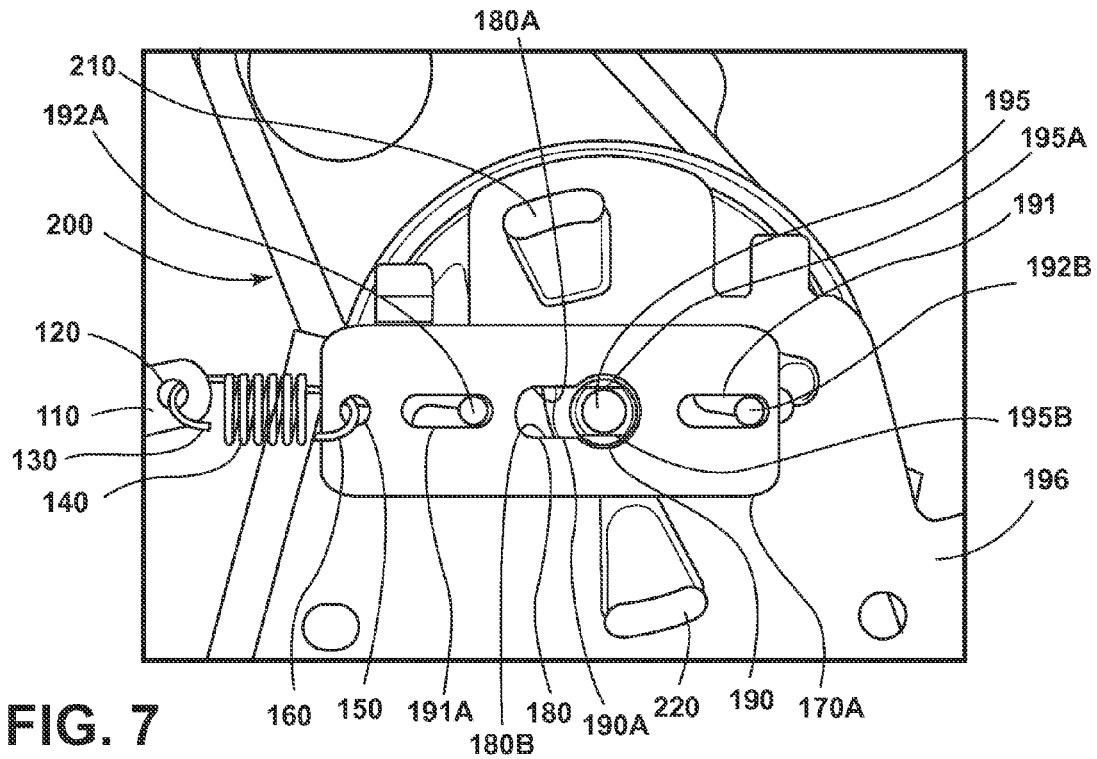
FIG. 7 is an inertia locking system for a vehicle seat assembly, according to the exemplary embodiment of FIG. 4, when the system is in normal usage.

FIG. 7 represents the inertia locking system 100 that includes an inertia locking bracket 170A that is substantially identical to the bracket 170A of FIG. 4, but including pins 192A and 192B that are substantially identical to the pin 192 of FIGS. 2 and 3. In this exemplary embodiment, having an additional elongate slot 191A and an additional pin 192A provides enhanced stability to the inertia locking bracket 170A. Specifically, pins 192A and 192B slidably support bracket 170A on opposite sides of double D-shaped shaft 195 such that double D-shaped shaft 195 does not need to engage the edges of opening 190 to support bracket 170A when the bracket 170A is in the position shown in FIG. 7. FIG. 7 represents a normal operating condition where the double D-shaped shaft 195 may rotate in the circular opening 190.

Figure 8:
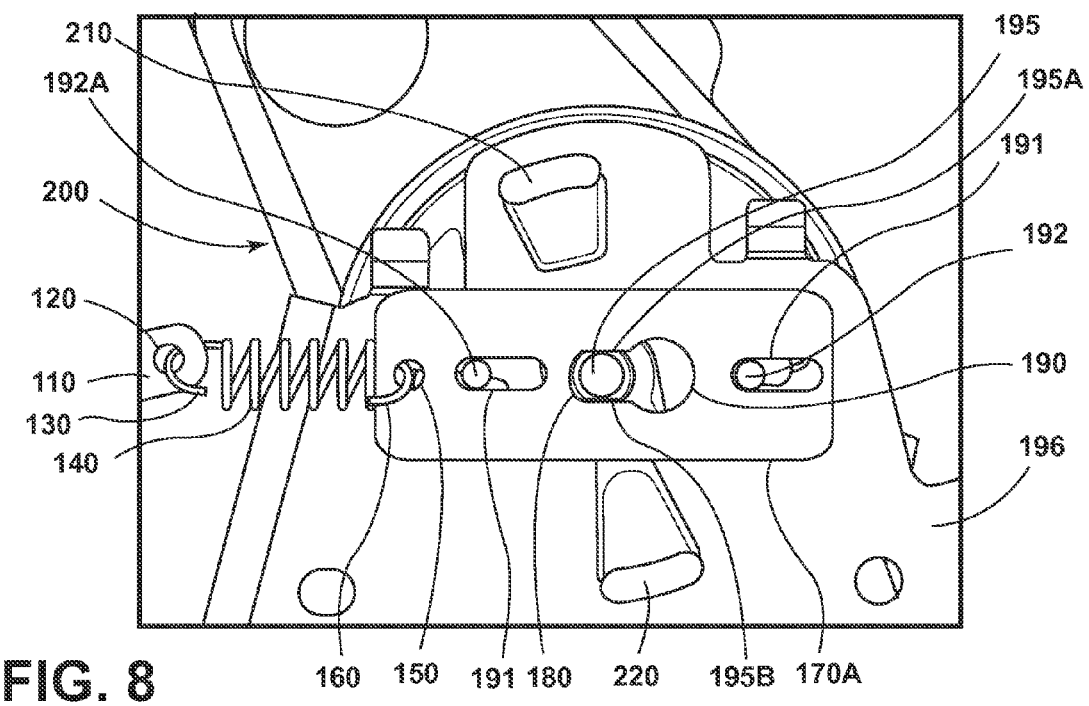
FIG. 8 is an inertia locking system for a vehicle seat assembly according to the exemplary embodiment of FIG. 7 when the system is experiencing acceleration.

FIG. 8 represents the operation of the inertia locking bracket 170A of FIG. 7 when the bracket 170A experiences an acceleration. In this exemplary embodiment, the spring 140 is extended, the inertia locking bracket 170A has moved to the right in a vehicle forward direction, and the pins 192A and 192B are positioned near the left side of the elongate slots 191 and 191A due to movement of the inertia locking bracket 170A. In this exemplary embodiment, the movement of the inertia locking bracket 170A to the right results in the double D-shaped shaft 195 being positioned in the first elongate slot 180. Flat surfaces 195A and 195B of double D-shaped shaft 195 engage edges 180A and 180B of slot 180 to thereby prevent rotation of double D-shaped shaft 195 relative to bracket 170A, and pins 192A and 192B engage slots 191A and 191, respectively, to prevent rotation of bracket 170A. Pins 192A and 192B are fixed to base member 196. Because double D-shaped shaft 195 is fixed to seat back 400, seat back 400 cannot rotate when bracket 170A is in the position of FIG. 8.

Figure 9:
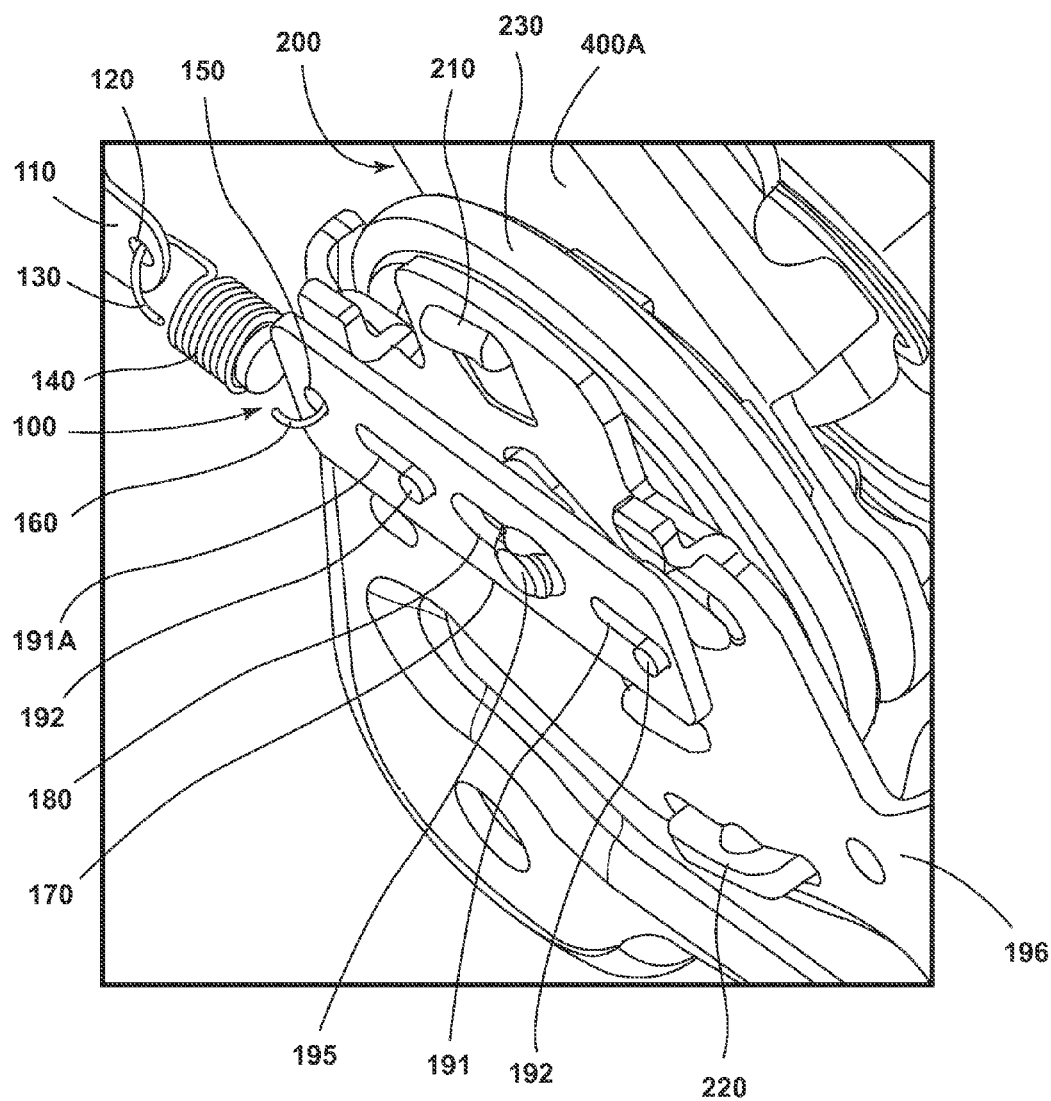
FIG. 9 is a perspective view of the inertia locking system of FIG. 8.

FIG. 9 is a perspective view of the inertia locking system 100 of FIG. 7 during normal operation. As discussed above in connection with FIG. 7, the additional slot 191A and the additional pin 192A provide additional stability to the inertia locking system 100. Back mechanism 200 may include a torsion spring that biases seat back 400 towards an upright or forward position. Bracket 110 may comprise an extension of base member 196 such that bracket 110 and base member 196 may have an integral one piece construction. The base member 196, seat structure 196A, back structure 400A, bracket 170, and shaft 196 may comprise steel or other suitable material.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the claims.

What is claimed is:

1. An inertia locking system for a seat back mechanism of a seatback of a vehicle, the inertia locking system comprising:
    a base member configured to be connected to a seat back mechanism;
    a double D-shaped shaft configured to be mounted to the seat back mechanism;
    an inertia locking bracket that is movable between a rest position and a locked position having a circular opening, wherein the double-D shaped shaft is disposed in the circular opening of the inertia locking bracket;
    a first elongate slot extending from a side of the circular opening;
    a second elongate slot in the inertia locking bracket, the second elongate slot being adjacent to the circular opening and first elongate slot;
    a pin connected to the base member and protruding from the second elongate slot; and
    a spring connected to the inertia locking bracket at a location near an edge of the inertia locking bracket, wherein the second elongate slot is between the spring and the first elongate slot, and wherein as a result of a frontal vehicular collision, the inertia locking bracket slides in a vehicle forward direction and the double D-shaped shaft becomes locked in the first elongate slot to prevent the seat mechanism from releasing the seatback as a result of the frontal vehicular collision.

2. The inertia locking system of claim 1, wherein:
    the pin shifts in the second elongate slot when the inertia locking bracket shifts in a vehicle forward direction during a vehicular collision in order to help stabilize the inertia locking bracket.

3. The inertia locking system of claim 1, wherein:
    the spring is configured to extend in response to the inertia locking bracket moving in a vehicle forward direction during a frontal collision.

4. The inertia locking system of claim 1, further comprising:
    a third elongate slot between the first elongate slot and an end of the inertia locking bracket where the spring is located; and
    a second pin protruding from the third elongate slot, wherein the second pin is mounted to the base member.

5. The inertia locking system of claim 4, further comprising:
    a fourth elongate slot extending from the circular opening in the inertia locking bracket, wherein the fourth elongate slot extends in a direction opposite from the first elongate slot.

6. The inertia locking system of claim 5, further comprising:
    a second spring attached to the inertia locking bracket at a location opposite from the first spring, wherein an opposite end of the second spring is configured to be attached to a bracket connected to the base member, wherein in response to a rear collision, the inertia locking bracket will shift in a vehicle rearward direction so that the double D-shaped shaft is locked in the fourth elongate slot, and wherein the second pin is shifted to a different location in the third elongate slot when the inertia locking bracket is moved in a vehicle rearward direction during a collision, and wherein the second pin and the third elongate slot help stabilize the inertia locking bracket during the collision.

7. The inertia locking system of claim 1, wherein:
    during a collision, the inertia locking system is configured to move about 5-100 mm to lock the double D-shaped shaft in the first elongate slot within about 5-45 ms and about 5-20 g.

8. A seat back mechanism having an inertia locking system for preventing a vehicle seatback from being released from a working position during a collision, the inertia locking system of the seat back mechanism comprising:
    a base member configured to be connected to the seat back mechanism;
    a shaft configured to be mounted to the seat back mechanism, wherein rotation of the shaft releases the seatback mechanism to permit adjustment of a tilt angle of the seatback;
    an inertia locking bracket that is configured to move from a rest position to a locked position, the inertia locking bracket having an opening defining a first portion and a second portion, wherein the shaft is disposed in the first portion of the opening when the bracket is in a locked position, and wherein the shaft is disposed in the second portion of the opening of the inertia locking bracket when the inertia bracket is in a rest position;
    a spring connected to the inertia locking bracket and biasing the inertia locking bracket towards its rest position; and wherein as a result of a frontal collision, the inertia locking bracket slides in a vehicle forward direction from its rest position to a locked position such that the shaft is disposed in the first portion of the opening and prevents the seat back mechanism from releasing the seatback by preventing rotation of the shaft.

9. The inertia locking system of claim 8, wherein:
the shaft has a double D-shape in cross section with oppositely facing flat surfaces, and wherein the first portion of the opening comprises a first elongate slot and the second portion of the opening comprises a circular opening.

10. The inertia locking system of claim 9, further comprising:
a second elongate slot in the inertia locking bracket, the second elongate slot being adjacent to the circular opening;
a pin connected to the base member and protruding from the second elongate slot.

11. The inertia locking system of claim 10, further comprising:
a third elongate slot between the first elongate slot and the spring; and
a second pin protruding from the third elongate slot, wherein the second pin is mounted to the base member.

12. The inertia locking system of claim 11, further comprising:
a fourth elongate slot extending from the circular opening in the inertia locking bracket, wherein the fourth elongate slot extends in a direction opposite from the first elongate slot.

13. The inertia locking system of claim 12, further comprising:
a second spring attached to the inertia locking bracket at a location opposite from the first spring, wherein an opposite end of the second spring is configured to be attached to a bracket connected to the base member, wherein in response to a rear collision, the double D-shaped shaft will shift in a vehicle rearward direction to be locked in the fourth elongate slot, and wherein the second pin is shifted to a different location in the third elongate slot when the inertia locking bracket moves in a vehicle rearward direction in response to a collision.

14. The inertia locking system of claim 9, wherein during a collision, the inertia locking system is configured to lock the double D-shaped shaft when the shaft has shifted about 5-100 mm within about 5-45 ms and about 5-20 g.

15. A seatback adjustment mechanism, comprising:
a base and a shaft with opposite flat surfaces mounted thereto that rotates to release the adjustment mechanism;
a bracket movably connected to the base and having a circular opening, with the shaft rotatably disposed therein, and a slot extending from the circular opening;
a spring connected to the bracket; and
wherein the bracket slides forward and the slot engages the opposite flat surfaces to rotationally lock the shaft.

16. The seatback adjustment mechanism of claim 15, wherein:
the spring is configured to extend in response to the bracket sliding in a vehicle forward direction during a frontal collision.

17. The inertia locking system of claim 15, wherein:
during a collision, the inertia lock is configured to lock the double D-shaped shaft when the double D-shaped shaft moves 10 mm at 27 ms and 13 g.

18. An inertia lock to prevent release of a seatback, comprising:
a base and a double D-shaped shaft mounted thereto:
a movable bracket having a circular opening, with the double D-shaped shaft disposed therein, and a first slot extending from the circular opening;
a second slot in the movable bracket;
a first pin disposed in the second slot;
a spring connected to the bracket; and
wherein the movable bracket slides forward and rotationally locks the double D-shaped shaft;
a third slot between the first slot and the spring; and
a second pin protruding from the third slot and being movable therein, wherein the second pin is mounted to the base.

19. The inertia lock of claim 18, further comprising:
a fourth slot extending from the circular opening in the movable bracket, wherein the fourth slot extends in a direction opposite from the first slot.

20. The inertia lock of claim 19, further comprising:
a second spring attached to the movable bracket at a location opposite from the first spring, wherein an opposite end of the second spring is configured to be attached to a bracket connected to the base member, wherein in response to a rear collision, the inertia locking bracket will shift in a vehicle rearward direction so that the double D-shaped shaft is locked in the fourth slot, and wherein the second pin will shift location in the third slot when the movable bracket moves in a vehicle forward direction, and wherein the second pin helps stabilize the double D-shaped shaft in the movable bracket during a collision.

* * * * *